(12) United States Patent
Hulme et al.

(10) Patent No.: US 7,932,198 B2
(45) Date of Patent: *Apr. 26, 2011

(54) GREY GLASS COMPOSITION

(75) Inventors: Richard Hulme, Rochester Hills, MI (US); Scott V. Thomsen, South Lyon, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 559 days.

This patent is subject to a terminal disclaimer.

(21) Appl. No.: 11/979,557

(22) Filed: Nov. 5, 2007

(65) Prior Publication Data

US 2009/0062104 A1    Mar. 5, 2009

Related U.S. Application Data

(63) Continuation-in-part of application No. 11/896,606, filed on Sep. 4, 2007.

(51) Int. Cl.
*C03C 3/087* (2006.01)

(52) U.S. Cl. .......................... 501/71; 501/70

(58) Field of Classification Search .............. 501/70, 501/71
See application file for complete search history.

(56) References Cited

U.S. PATENT DOCUMENTS

| | | | |
|---|---|---|---|
| 3,296,004 A | 1/1967 | Duncan et al. | |
| 3,723,142 A * | 3/1973 | Kato et al. | 501/71 |
| 4,339,541 A * | 7/1982 | Dela Ruye | 501/71 |
| 5,318,931 A | 6/1994 | Nakaguchi et al. | |
| 5,364,820 A | 11/1994 | Morimoto et al. | |
| 5,747,398 A | 5/1998 | Higby et al. | |
| 5,837,629 A | 11/1998 | Combes et al. | |
| 5,977,002 A * | 11/1999 | Boulos et al. | 501/71 |
| 6,080,695 A | 6/2000 | Scheffler-Hudlet et al. | |
| 6,114,264 A * | 9/2000 | Krumwiede et al. | 501/70 |
| 6,170,292 B1 * | 1/2001 | Boulos et al. | 65/30.1 |
| 6,235,666 B1 | 5/2001 | Cochran et al. | |
| 6,333,287 B1 * | 12/2001 | Seto | 501/70 |
| 6,498,118 B1 * | 12/2002 | Landa et al. | 501/64 |
| 6,521,558 B2 | 2/2003 | Landa et al. | |
| 6,716,780 B2 | 4/2004 | Landa et al. | |
| 6,821,918 B2 | 11/2004 | Boulos et al. | |
| 6,858,553 B2 * | 2/2005 | Seto et al. | 501/70 |
| 6,953,758 B2 | 10/2005 | Arbab et al. | |
| 7,135,425 B2 | 11/2006 | Thomsen et al. | |
| 7,151,065 B2 * | 12/2006 | Thomsen et al. | 501/71 |
| 2002/0025899 A1 * | 2/2002 | Higby et al. | 501/71 |
| 2003/0083188 A1 * | 5/2003 | Seto et al. | 501/71 |
| 2003/0114290 A1 * | 6/2003 | Landa et al. | 501/64 |
| 2005/0020430 A1 * | 1/2005 | Thomsen et al. | 501/64 |
| 2005/0032624 A1 | 2/2005 | Teyssedre et al. | |
| 2007/0243993 A1 * | 10/2007 | Heithoff et al. | 501/71 |
| 2009/0025426 A1 * | 1/2009 | Landa et al. | 65/30.13 |
| 2009/0062103 A1 * | 3/2009 | Broughton et al. | 501/71 |

FOREIGN PATENT DOCUMENTS

| | | |
|---|---|---|
| DE | 196 36 300 | 3/1997 |
| EP | 0 682 646 | 11/1995 |
| EP | 0 834 481 | 4/1998 |
| FR | 2 672 587 | 8/1992 |
| GB | 2 252 973 | 8/1992 |
| GB | 2304710 A * | 3/1997 |
| JP | 52 102310 | 8/1977 |

OTHER PUBLICATIONS

International Search Report dated May 28, 2008.
U.S. Appl. No. 11/896,606, filed Sep. 4, 2007.

* cited by examiner

*Primary Examiner* — Karl E Group
*Assistant Examiner* — Elizabeth A Bolden
(74) *Attorney, Agent, or Firm* — Nixon & Vanderhye P.C.

(57) ABSTRACT

A grey glass composition employing in its colorant portion at least iron ($Fe_2O_3$/FeO), cobalt and selenium is provided. The glass allows high visible transmission, and good IR absorption, while at the same time achieving desired grey color. In certain example embodiments, the colorant portion includes, or may consist essentially of:

| | |
|---|---|
| total iron (expressed as $Fe_2O_3$) | 0.20 to 0.40% |
| selenium | 2-20 ppm |
| cobalt oxide | 0.0025 to 0.0060% |
| titanium oxide | 0 to 1.0% |
| glass redox: | <=0.30. |

24 Claims, No Drawings

GREY GLASS COMPOSITION

This is a continuation-in-part (CIP) of U.S. Ser. No. 11/896,606, filed Sep. 4, 2007, the entire disclosure of which is hereby incorporated herein by reference. This invention relates to grey glass compositions and methods of making the same. More particularly, this invention relates to neutral grey glass compositions which are capable of achieving high light transmittance in the visible range and acceptable solar properties (e.g., reduced IR transmission and acceptable % TS). Such glass compositions are useful, for example and without limitation, in automotive windows (e.g., windshields, sidelites, backlites and sunroofs) and/or in architectural/residential window applications.

BACKGROUND OF THE INVENTION

Grey colored glass is desirable in certain architectural applications, for instance where the glass when used in window applications protects the occupants or interior of a building from ambient solar conditions. Additionally, the automotive industry, for a number of years, has desired glass having grey color for automotive window applications. At the same time, it is also desirable for transmission in the IR (infrared) range of the light spectrum to be minimized. It is difficult to couple desirable grey color, high visible transmittance (e.g., 55% or higher), and reduced IR transmittance in a commercially acceptable glass.

A glass window or other glass article is said to have the desirable color "grey" when it has a dominant wavelength of from 435 nm to 570 nm, more preferably from 470-555 nm, and most preferably from about 480-500 nm. Moreover, grey glass preferably has an excitation purity (Pe) of less than or equal to about 5.0%.

While glass having "grey" color is often desirable, as explained above there sometimes also exists a need or desire to achieve certain levels of light transmission defined conventionally by:
Lta as visible light transmission,
UV as ultraviolet light transmission, and
IR as infrared light transmission.

Glass thickness ranges of from about 1-7 mm, more preferably from about 3-4 mm, are typically used when measuring the aforesaid characteristics. These thickness ranges are generally recognized as conventional thicknesses for glass sheets made by the float glass process, as well as recognized thickness ranges in the automotive industry.

Certain known green solar control float glasses are formulated so as to achieve desirable solar characteristics due in large part to their use of large quantities of total iron. Unfortunately, the green coloration of such glasses does not always harmonize well with certain exterior automotive paints and sometimes affects vehicle interiors when viewed through the glass, and large amounts of iron are not always desirable for glass processing.

U.S. Pat. No. 6,235,666 discloses a grey glass composition capable of achieving good solar performance characteristics, including the desirable color grey. In particular, U.S. Pat. No. 6,235,666 discloses a grey glass with a colorant portion including 0.5-0.8% total iron (expressed as $Fe_2O_3$), 0.5-3.0% $Er_2O_3$, and 0.0-1.0% $TiO_2$. While this is an excellent glass, it is sometimes undesirable in that it requires much of the very expensive erbium oxide ($Er_2O_3$). Thus, there exists a need in the art for a grey glass which can achieve desired grey color in combination with acceptable solar performance properties, without the need for much erbium.

U.S. Pat. No. 7,135,425 also discloses a grey glass composition. Example 1 of the '425 patent includes 0.28% total iron (expressed as $Fe_2O_3$), 0.18% erbium oxide, 3 ppm Se, 19 ppm cobalt oxide, 0.145% FeO; and a glass redox of 0.5, thereby achieving a visible transmission of about 70.5%, IR transmittance (% IR) of about 40.3, and total solar transmittance (% TS) of about 53.07. The '425 patent explains that IR absorption is achieved by using a high glass redox, namely of at least 0.35, and preferably at least 0.46 (e.g., see column 4, lines 60-66). Unfortunately, while such glasses of the '425 patent achieve good color and are acceptable in many respects, they are undesirable with respect to requiring such high glass redox values (i.e., glass redox of greater than 0.35, preferably at least 0.46). Such high glass redox values are undesirable in that blue coloration can result therefrom so that true grey color cannot be achieved; the '425 patent uses the expensive element erbium to compensate for this effect. Additionally, such high glass redox values are undesirable in that they require special compensation during the glass manufacturing such as furnace atmosphere compensation and/or significant refining additions to the batch mixture as will be appreciated by those skilled in the art.

U.S. Pat. No. 5,364,820 discloses a neutral grey glass. Example 1 of the '820 patent includes, for example, 0.403% total iron (expressed as $Fe_2O_3$), 0.41% cerium oxide, 0.31% titanium oxide, 23.2 ppm CoO, 7.6 ppm Se, and a glass redox of 0.243. This example of the '820 patent has a visible transmission of 70.3%, a total solar transmission (% TS) of 60.4%, and an infrared (IR) transmission (% IR) of 59%. Unfortunately, this example of the '820 patent is undesirable due to its very high IR transmittance (% IR) and also its very high amount of expensive cerium oxide required. In particular, it is often undesirable to allow this much IR radiation through the glass, and it is also undesirable to require this much expensive cerium oxide.

In view of the above, it is apparent that there exists a need in the art for a new glass composition which overcomes one or more of the above problems while achieving desired grey color and desired solar management property(ies) (e.g., IR blocking functionality) of the particular industry in which it is to be used.

SUMMARY OF EXAMPLE EMBODIMENTS OF THE INVENTION

An example embodiment of this invention provides a grey glass having a dominant wavelength of from 435 nm to 570 nm (more preferably from about 470-555 nm, and most preferably from about 480-500 nm) and acceptable solar performance characteristics. The glass includes a colorant portion having from 0.20 to 0.40% total iron (expressed as $Fe_2O_3$) (more preferably from 0.23 to 0.35%, even more preferably from 0.23 to 0.32%; most preferably from 0.25 to 0.30%); a glass redox of no greater than 0.30 (more preferably from 0.18 to 0.30, even more preferably from about 0.18 to 0.25, and most preferably from 0.18 to 0.24); from about 2 to 20 ppm Se (more preferably from about 3 to 12 ppm, and most preferably from about 3 to 8 ppm Se); from about 25 to 60 ppm cobalt oxide (more preferably from about 30 to 55 ppm, and most preferably from about 35 to 50 ppm cobalt oxide); and from 0 to 1% titanium oxide (more preferably from 0 to 0.75%; most preferably from 0.05 to 0.60%).

In certain example embodiments of this invention, the glass is substantially free of one, two or all three of erbium oxide, nickel oxide and cerium oxide.

In certain example embodiments of this invention, the greenish tint of the iron oxide is compensated for with the coloration of the selenium and cobalt oxide mixture. Moreover, the low glass redox allows manufacturing of the glass to take place without or with reduced need for special compensation of furnace atmosphere and/or refining additions in the batch mixture.

The aforesaid glass compositions surprisingly allow for a high visible transmission to be achieved (e.g., at least 55%, more preferably at least about 59%) in combination with good IR blocking functionality. For example, in certain example embodiments of this invention, the glass has, in combination with the aforesaid high visible transmission, % IR no greater than 55%, 52%, 50%, or 45% (e.g., % IR of from about 36-55%, more preferably from about 38-50%, and most preferably from about 38-45%) so as to provide a grey colored glass (possibly with a blue hue) with low IR transmission properties and low solar heat gain while maintaining high visible transmittance.

In certain example embodiments of this invention, there is provided a grey glass comprising:

a base glass portion comprising:

| Ingredient | wt. % |
| --- | --- |
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-7% | and a colorant portion consisting essentially of or comprising:

| | |
| --- | --- |
| total iron (expressed as $Fe_2O_3$) | 0.20 to 0.40% |
| selenium | 2-20 ppm |
| cobalt oxide | 0.0025 to 0.0060% |
| titanium oxide | 0 to 1.0% | wherein the grey glass has a redox value ($FeO/Fe_2O_3$) of no greater than 0.30, a visible transmittance (Lta) of at least 55%, a dominant wavelength in the range of from 470 nm to 555 nm, an excitation purity (Pe) of no greater than 5.0%, and an IR transmittance (% IR) of no greater than 55%.

In certain example embodiments of this invention, there is provided a grey glass comprising:

a base glass portion comprising:

| Ingredient | wt. % |
| --- | --- |
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-7% | and a colorant portion consisting essentially of or comprising:

| | |
| --- | --- |
| total iron (expressed as $Fe_2O_3$) | 0.20 to 0.40% |
| selenium | 0.0002 to 0.0020% |
| cobalt oxide | 0.0025 to 0.0060% |
| titanium oxide | 0 to 1.0% | wherein the grey glass has a redox value ($FeO/Fe_2O_3$) of no greater than 0.27, a visible transmittance (Lta) of at least 55%, a dominant wavelength in the range of from 470 nm to 555 nm, an excitation purity (Pe) of no greater than 5.0%, and an IR transmittance (% IR) of no greater than 55%.

DETAILED DESCRIPTION OF CERTAIN EXAMPLE EMBODIMENTS OF THIS INVENTION

Grey glasses according to different embodiments of this invention may be used, for example, as windows in architectural glass applications, windows in the automotive industry, and/or in other suitable applications.

Certain glasses according to this invention utilize soda-lime-silica glass as their base composition/glass, to which are added certain ingredients making up a unique colorant portion. An example soda-lime-silica base glass according to certain embodiments of this invention, on a weight percentage basis, includes the following basic ingredients:

TABLE 1

Example Base Glass

| Ingredient | Wt. % |
| --- | --- |
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-7% |

Other minor ingredients, including various refining aids, such as salt cake, crystalline water and/or the like may also be included in the base glass. In certain embodiments, for example, glass herein may be made from batch raw materials silica sand, soda ash, dolomite, limestone, with the use of salt cake ($SO_3$) as a refining agent. Reducing agent(s) such as Si (metallic) (Si), silicon monoxide (SiO), sucrose, and/or carbon may also be used. Preferably, soda-lime-silica base glasses herein include by weight from about 10-15% $Na_2O$ and from about 6-12% CaO.

In certain example embodiments of this invention, to the base glass (e.g., see Table 1 above) a colorant portion is added which causes the resulting glass to be grey in color (see dominant wavelength discussed herein) and achieve desirable solar management properties (e.g., reduced IR transmission coupled with high visible transmission). In certain example embodiments, the glass includes a colorant portion of or including from 0.20 to 0.40% total iron (expressed as $Fe_2O_3$) (more preferably from 0.23 to 0.35%; most preferably from 0.23 to 0.32%); a glass redox of no greater than 0.30 (more preferably from 0.18 to 0.30; most preferably from 0.18 to 0.25 or from 0.18 to 0.24); from about 2 to 20 ppm Se (more preferably from about 3 to 12 ppm, and most preferably from about 3 to 8 ppm Se); from about 25 to 60 ppm cobalt oxide (more preferably from about 30 to 55 ppm, and most preferably from about 35 to 50 ppm cobalt oxide); and from 0 to 1% titanium oxide (more preferably from 0 to 0.75%; most preferably from 0.05 to 0.60%).

In certain example embodiments or this invention, the glass is substantially free of one, two or all three of erbium oxide, nickel oxide and cerium oxide. In certain example embodiments of this invention, the greenish tint of the iron oxide is compensated for with the coloration of the selenium and cobalt oxide mixture. Moreover, the low glass redox allows manufacturing of the glass to take place without or with reduced need for special compensation of furnace atmosphere and/or refining additions in the batch mixture.

As mentioned above, in certain example embodiments or this invention, the colorant portion of the glass (or the glass itself) is substantially free of one, two or all three of erbium oxide, nickel oxide and cerium oxide. In particular, in certain example embodiments of this invention, the colorant portion includes no more than about 0.010%, more preferably no more than about 0.005% and most preferably no more than about 0.001% or 0% of each of erbium oxide, nickel oxide and cerium oxide. Trace amounts, possibly greater than this, of nickel oxide are more likely to be present in glasses according to certain example embodiments of this invention, than are cerium oxide and erbium oxide which may be at 0% in certain example embodiments of this invention.

The colorant portions in different embodiments of this invention may either comprise the materials in Table 2 below, or consist essentially of the materials in Table 2 below.

TABLE 2

Example Colorant Portion

| Ingredient | Preferred | More Preferred | Most Preferred |
| --- | --- | --- | --- |
| Total iron (expressed as $Fe_2O_3$): | 0.20 to 0.40% | 0.23 to 0.35% | 0.23 to 0.33% |
| Selenium (Se): | 2-20 ppm | 3-12 ppm | 3-8 ppm |
| Cobalt oxide (e.g., $Co_3O_4$): | 0.0025-0.0060% | .0030-0.0055% | 0.0035-0.0050% |
| Titanium Oxide (e.g., $TiO_2$): | 0 to 1.0% | 0 to 0.75% | 0.05 to 0.60% |
| % FeO (wt. % spectral): | 0.04 to 0.11% | 0.04 to 0.10% | 0.05 to 0.09% |
| Glass Redox ($FeO/Fe_2O_3$): | $<=0.30$ | 0.18 to 0.30 | 0.18 to 0.25 |
| Cerium oxide (e.g., $Ce_2O_3$): | $<=0.010$ or 0.005 | $<=0.001$ | 0 |
| Erbium oxide (e.g., $Er_2O_3$): | $<=0.010$ or 0.005 | $<=0.001$ | 0 |

However, it should be appreciated that small amounts of other materials (e.g., refining aids, melting aids, and/or impurities) may be present in the glass such as chromium, manganese, molybdenum, tin, chlorine, zinc, zirconium, Si, sulfur, fluorine, lithium and strontium, without taking away from the purpose(s) and/or goal(s) of the instant invention.

The aforesaid colorant portion allows grey color to be achieved, while at the same time maintaining satisfactory solar performance properties including high visible transmission coupled with low IR (infrared) and acceptable total solar properties.

In certain example embodiments herein, glasses may be characterized by one or more of the optical characteristics set forth below when measured at a nominal thickness of from 1-7 mm, more preferably from about 3-7 mm (about 5, 6 or 7 mm may be used for a reference thickness in certain example non-limiting embodiments). In Table 3, color values a*, b* and L* are in accordance with Ill. D65, 10 degree observer, as is known in the art. Note that % UV was determined in accordance with ISO 9050, AM1.5. IR % was measured for 800-2100 nm.

TABLE 3

Example Optical Characteristics

| Characteristic | Preferred | More Preferred | Most Preferred |
| --- | --- | --- | --- |
| Lta (visible transmittance): | $>=55\%$ | $>=59\%$ | 59-66% |
| $IR_{transmission}$ (% IR): | 36-55% | 38-50% | 38-45% |

TABLE 3-continued

Example Optical Characteristics

| Characteristic | Preferred | More Preferred | Most Preferred |
| --- | --- | --- | --- |
| $UV_{transmission}$ (% UV): | 25-35% | 25-32% | 27-30% |
| % TS (total solar): | 53-59% | 54-59% | 53-58% |
| Dominant Wavelength (λ): | 435-570 nm | 470-555 nm | 480-500 nm |
| Excitation Purity (Pe): | $<=5.0$ | $<=4.5$ | $<=3.0$ |
| a* (Ill. D65, 10 deg): | −1 to −4 | −1.5 to −3.5 | −2 to −3 |
| b* (Ill. D65, 10 deg): | +2 to −6 | 0 to −5 | −1 to −4 |
| L* (Ill. D65, 10 deg.): | 79 to 87 | 80 to 86 | 82 to 85 |

The "grey" color achieved by glasses according to certain example embodiments of this invention is a function of dominant wavelength and excitation purity. Grey glass herein typically has a dominant wavelength of from 435 nm to 570 nm, and an excitation purity (Pe) of no greater than about 5.0 or 4.5%. Moreover, it can be seen from the above that desired grey coloration and high visible transmission have surprisingly been coupled with low IR values.

The total amount of iron present in the glass, and thus in the colorant portion thereof, is expressed herein in terms of $Fe_2O_3$ in accordance with standard practice. This, however, does not imply that all iron is actually in the form of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass (i.e., glass redox), which is expressed as the ratio $FeO/Fe_2O_3$, which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. Iron in the ferrous state ($Fe^{2+}$; FeO) is a blue-green colorant, while iron in the ferric state ($Fe^{3+}$) is a yellow-green colorant. According to certain embodiments of this invention, the colorant portion of the glass composition herein is characterized by a glass redox value (i.e., $FeO/Fe_2O_3$) of no greater than 0.30, more preferably from 0.18 to 0.30, even more preferably from 0.18 to 0.25, and most preferably from 0.18 to 0.24. It is noted that in different embodiments of this invention iron may be added to the glass batch during the manufacturing process in any suitable form (e.g., via rouge and/or melite).

Glass according to certain embodiments of this invention is often made via the known float process in which a tin bath is utilized. It will thus be appreciated by those skilled in the art that as a result of forming the glass on molten tin in certain example embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

Se (selenium) may be present in the colorant portion in different embodiments, and acts as a pink colorant. While selenium often combines with iron as iron selenide (FeSe) in glass to produce brown color, selenium is referred to in the colorant portion herein as "Se" which is meant to include, for example, its state as Se as well as its other states in glass such as FeSe.

Cobalt (Co) is a blue colorant. It is believed that much of the cobalt in the glass is in the oxide state of $Co_3O_4$. However, other oxide states of CoO are also possible in glasses according to this invention. Thus, unless expressly stated to the contrary, the terms "cobalt oxide", "CoO" and "$Co_3O_4$" as used herein include not only cobalt in this/these particular oxide state(s), but also include(s) cobalt which may be present in other oxide or non-oxide state(s).

Erbium (Er) is a pink colorant. In certain embodiments of this invention, glasses herein are free of erbium (and erbium oxide). However, in other example embodiments, small amounts of erbium may be used. In such cases, it is believed that much of the erbium in the glass is in the oxide state of $Er_2O_3$. However, other oxide states of erbium are also possible in glasses according to this invention. Thus, unless expressly stated to the contrary, the terms "erbium oxide" and "$Er_2O_3$" as used herein include not only erbium in this/these particular oxide state(s), but also include(s) erbium which may be present in other oxide or non-oxide state(s).

Titanium oxide is an optional colorant, which also performs UV absorption functionality, in certain example embodiments of this invention. Numerous oxide states of Ti are possible. Thus, unless expressly stated to the contrary, the terms "titanium oxide" and "$TiO_2$" as used herein include not only Ti in this/these particular oxide state(s), but also include(s) Ti which may be present in other oxide or non-oxide state(s).

EXAMPLES

The glasses of certain example embodiments of this invention may be made from batch ingredients using well known glass melting and refining techniques once given the above final glass analysis. Salt cake was used as a refining agent in a known manner. Examples herein included the following compositions, respectively, in terms of wt. % of the total glass if not indicated otherwise. The redox in the table below is the glass redox, as opposed to the batch redox. The % FeO content was measured spectrally. Note that trace amounts or Ba, Cr and Ni were provided in each example, but are not listed below for purposes of simplicity. No cerium oxide or erbium oxide was present in any of the examples.

TABLE 4

Glass Compositions of Examples 1-4

| Mat'l/Property | Ex. 1 | Ex. 2 | Ex. 3 | Ex. 4 |
|---|---|---|---|---|
| $SiO_2$ | 73.29% | 72.16% | 72.51% | 71.36% |
| $Al_2O_3$ | 0.366% | 0.346% | 0.353% | 0.35% |
| CaO | 8.41% | 8.76% | 8.73% | 9.13% |
| MgO | 3.82% | 4.01% | 4.01% | 4.19% |
| $Na_2O$ | 13.52% | 14.05% | 13.70% | 14.21% |
| $K_2O$ | 0.08% | 0.08% | 0.08% | 0.08% |
| MnO | 0.015% | 0.015% | 0.015% | 0.015% |
| $SO_3$ | 0.174% | 0.27% | 0.287% | 0.34% |

TABLE 4-continued

Glass Compositions of Examples 1-4

| Mat'l/Property | Ex. 1 | Ex. 2 | Ex. 3 | Ex. 4 |
|---|---|---|---|---|
| total iron ($Fe_2O_3$): | 0.291% | 0.279% | 0.289% | 0.287% |
| selenium (Se): | 0.0005% | 0.0006% | 0.0007% | 0.0005% |
| cobalt oxide ($Co_3O_4$): | 0.0039% | 0.0044% | 0.0029% | 0.0046% |
| titanium oxide ($TiO_2$): | 0.027% | 0.026% | 0.026% | 0.026% |
| % FeO | 0.0624 | 0.0564 | 0.0536 | 0.0522 |
| Glass Redox ($FeO/Fe_2O_3$): | 0.21 | 0.20 | 0.19 | 0.18 |

Solar characteristics for the example glasses at about 4-7 mm thickness were as follows (corrected to 6 mm thickness for each example), where Lta (visible transmission), L*, a* and b* were measured with respect to Ill. D65, 10 degree observer:

TABLE 5

Solar Characteristics of Examples

| Property | Ex. 1 | Ex. 2 | Ex. 3 | Ex. 4 |
|---|---|---|---|---|
| Lta (visible trans. %): | 62.03 | 62.88 | 64.18 | 63.40 |
| % IR: | 49.36 | 52.20 | 53.53 | 54.37 |
| % UV (ISO9050 AM1.5): | 29.32 | 31.82 | 27.45 | 30.42 |
| % TS: | 55.67 | 57.78 | 58.4 | 59.1 |
| L*: | 82.96 | 83.48 | 83.99 | 83.77 |
| a*: | -2.47 | -2.79 | -1.56 | -3.12 |
| b*: | -1.27 | -3.07 | 1.87 | -3.39 |
| Excit. Purity (Pe %): | 2.57 | 4.34 | 1.66 | 4.80 |
| Dom. Wavelength (nm): | 489 | 485 | 557 | 485 |

Example glasses for Examples 5-6 are set forth below. No cerium oxide or erbium oxide was present in any of these examples. The base glasses in these examples were similar to those of Examples 1-4, so additional materials are set forth below. The a* and b* color values were measured with respect to D65/10 degree.

TABLE 6

Glass Compositions and Solar Features of Examples 5-6

| Mat'l/Property | Ex. 5 | Ex. 6 |
|---|---|---|
| $SO_3$ | 0.27% | 0.27% |
| total iron ($Fe_2O_3$): | 0.35% | 0.32% |
| selenium (Se): | 4 ppm | 4 ppm |
| cobalt oxide ($Co_3O_4$): | 40 ppm | 38 ppm |
| % FeO: | 0.081 | 0.078 |
| Glass Redox ($FeO/Fe_2O_3$): | 0.23 | 0.24 |
| Ltc (visible trans. %): | 61.82 | 63.24 |
| % IR (800-2100 nm): | 40.4 | 41.95 |
| a*: | -2.61 | -2.41 |
| b*: | -1.88 | -2.26 |

Terms used herein are known in the glass art. For example, luminous transmittance (Lta) (Ill D65 10 degree observer) is understood in the art, and is used herein in accordance with its known meaning. The terms, and characteristics, of ultraviolet light transmittance (% UV), infrared energy transmittance (% IR), total solar transmittance (% TS), dominant wavelength (DW) and excitation purity (i.e. % "purity", or Pe) are also well understood terms in the art, as are their measurement techniques. Dominant wavelength (DW) may be calculated and measured conventionally in accord with the aforesaid CIE Publication 15.2 (1986) and ASTM: E 308-90. The term "dominant wavelength" includes both the actual measured wavelength and, where applicable, its calculated complement. Excitation purity (Pe or % "purity") may be measured conventionally in accordance with CIE Publication 15.2 (1986) and ASTM: E 308-90.

Once given the above disclosure many other features, modifications and improvements will become apparent to the skilled artisan. Such features, modifications and improvements are therefore considered to be a part of this invention, the scope of which is to be determined by the following claims:

What is claimed is:
1. A grey glass comprising:
a base glass portion comprising:

| Ingredient | wt. % |
|---|---|
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-7% | and a colorant portion consisting essentially of:

| total iron (expressed as $Fe_2O_3$) | 0.20 to 0.40% |
|---|---|
| selenium | 2-20 ppm |
| cobalt oxide | 0.0025 to 0.0060% |
| titanium oxide | less than 1.0% | wherein the grey glass contains titanium oxide and has, at a reference thickness of 6 mm, a redox value ($FeO/Fe_2O_3$) of no greater than 0.30, a visible transmittance (Lta) of from 59-66%, UV transmission of from 25-32%, a dominant wavelength in the range of from 470 nm to 555 nm, an excitation purity (Pe) of no greater than 5.0%, and an IR transmittance (% IR) of from 38-50%.

2. The glass of claim 1, wherein the glass has a redox value ($FeO/Fe_2O_3$) of from 0.18 to 0.30, and an IR transmittance (% IR) of no greater than 45%.

3. The glass of claim 1, wherein the glass has a dominant wavelength of from 480 to 500 nm and an excitation purity (Pe) of no greater than 4.5%.

4. The glass of claim 1, wherein the glass has a redox value ($FeO/Fe_2O_3$) of from 0.18 to 0.24.

5. The glass of claim 1, wherein the glass has a % TS of no greater than 50%.

6. The glass of claim 1, wherein said colorant portion consists essentially of:

| total iron (expressed as $Fe_2O_3$) | 0.23 to 0.35% |
|---|---|
| selenium | 3-12 ppm |
| cobalt oxide | 0.0025 to 0.0055% |
| titanium oxide | less than 0.75%. |

7. The glass of claim 1, wherein said colorant portion consists essentially of:

| total iron (expressed as $Fe_2O_3$) | 0.25 to 0.40% |
|---|---|
| selenium | 3-8 ppm |
| cobalt oxide | 0.0035 to 0.0050% |
| titanium oxide | less than 0.75%. |

8. The glass of claim 1, wherein the glass has a color characterized as follows when measured according to Ill. D65, 10 degree observer:

| a* | from −1 to −4 |
|---|---|
| b* | from +2 to −6. |

9. The glass of claim 1, wherein the glass has a color characterized as follows when measured according to Ill. D65, 10 degree observer:

| a* | from −1.5 to −3.5 |
|---|---|
| b* | from 0 to −5 |
| L* | from 80 to 86. |

10. A grey glass comprising:
a base glass portion comprising:

| Ingredient | wt. % |
|---|---|
| $SiO_2$ | 67-75% |
| $Na_2O$ | 10-20% |
| CaO | 5-15% |
| MgO | 0-7% |
| $Al_2O_3$ | 0-7% |
| $K_2O$ | 0-7% | and a colorant portion comprising:

| total iron (expressed as $Fe_2O_3$) | 0.20 to 0.40% |
|---|---|
| selenium | 2-20 ppm |
| cobalt oxide | 0.0025 to 0.0060% |
| titanium oxide | less than 1.0% | wherein the grey glass contains titanium oxide and has, at a reference thickness of 6 mm, a redox value ($FeO/Fe_2O_3$) of no greater than 0.30, a visible transmittance (Lta) of at least 55%, UV transmission of from 25-32%, a dominant wavelength in the range of from 470 nm to 555 nm, an excitation purity (Pe) of no greater than 5.0%, and an IR transmittance (% IR) of from 36-55%, and wherein the glass contains no more than about 0.010% of cerium oxide and erbium oxide.

11. The glass of claim 10, wherein the glass has a redox value ($FeO/Fe_2O_3$) of from 0.10 to 0.30 and an IR transmittance (% IR) of no greater than 45%.

12. The glass of claim 10, wherein the glass has a dominant wavelength of from 480 to 500 nm and an excitation purity (Pe) of no greater than 4.5%.

13. The glass of claim 10, wherein the glass has a redox value ($FeO/Fe_2O_3$) of from 0.18 to 0.25.

14. The glass of claim 10, wherein the glass has a % TS of no greater than 50%.

15. The glass of claim 10, wherein said colorant portion comprises:

| | |
|---|---|
| total iron (expressed as Fe$_2$O$_3$) | 0.20 to 0.40% |
| selenium | 3-12 ppm |
| cobalt oxide | 0.0025 to 0.0055% |
| titanium oxide | less than 0.75%. |

16. The glass of claim 10, wherein said colorant portion comprises:

| | |
|---|---|
| total iron (expressed as Fe$_2$O$_3$) | 0.25 to 0.35% |
| selenium | 3-8 ppm |
| cobalt oxide | 0.0035 to 0.0050% |
| titanium oxide | less than 0.75%. |

17. The glass of claim 10, wherein the glass has a color characterized as follows when measured according to Ill. D65, 10 degree observer:

| | |
|---|---|
| a* | from −1 to −4 |
| b* | from +2 to −6. |

18. The glass of claim 10, wherein the glass has a color characterized as follows when measured according to Ill. D65, 10 degree observer:

| | |
|---|---|
| a* | from −1.5 to −3.5 |
| b* | from 0 to −5 |
| L* | from 80 to 86. |

19. A grey glass comprising:
a base glass portion comprising:

| Ingredient | wt. % |
|---|---|
| SiO$_2$ | 67-75% |
| Na$_2$O | 10-20% |
| CaO | 5-15% | and a colorant portion comprising:

| | |
|---|---|
| total iron (expressed as Fe$_2$O$_3$) | 0.20 to 0.40% |
| selenium | 0.0002 to 0.0020% |
| cobalt oxide | 0.0025 to 0.0060% |
| titanium oxide | less than 1.0% | wherein the grey glass contains titanium oxide and, at a reference thickness of 6 mm, has a redox value (FeO/Fe$_2$O$_3$) of no greater than 0.27 a visible transmittance (Lta) of at least 55%, UV transmission of from 25-32%, a dominant wavelength in the range of from 470 nm to 555 nm, an excitation purity (Pe) of no greater than 5.0%, and an IR transmittance (% IR) of from 38-50%, and wherein the glass contains no more than about 0.010% of erbium oxide.

20. The glass of claim 19, wherein the glass has a dominant wavelength of from 480 to 500 nm and an excitation purity (Pe) of no greater than 4.5%.

21. The glass of claim 19, wherein the glass has a redox value (FeP/Fe$_2$O$_3$) of from 0.18 to 0.25.

22. The glass of claim 19, wherein said colorant portion consists essentially of:

| | |
|---|---|
| total iron (expressed as Fe$_2$O$_3$) | 0.20 to 0.35% |
| selenium | 0.0003 to 0.0012% |
| cobalt oxide | 0.0025 to 0.0055% |
| titanium oxide | less than 0.75%. |

23. The glass of claim 19, wherein the glass has a color characterized as follows when measured according to Ill. D65, 10 degree observer:

| | |
|---|---|
| a* | from −1 to −4 |
| b* | from +2 to −6 |
| L* | from 79 to 87. |

24. The glass of claim 19, wherein the glass has a redox value (FeO/Fe$_2$O$_3$) of from 0.10 to 0.25, and a visible transmittance (Lta) of at least 59%.

* * * * *